United States Patent [19]

Andrews

[11] Patent Number: 5,073,050
[45] Date of Patent: Dec. 17, 1991

[54] ERGONOMIC KEYBOARD APPARATUS

[76] Inventor: Steffen Andrews, 6501 N. 17th Ave., Suite C., Phoenix, Ariz. 85015

[21] Appl. No.: 536,978

[22] Filed: Jun. 12, 1990

[51] Int. Cl.$^5$ .............................................. B41J 3/54
[52] U.S. Cl. ..................................... 400/82; 400/489; 400/682; 400/715
[58] Field of Search ................. 400/82, 682, 715, 489; 346/76 L

[56] References Cited

U.S. PATENT DOCUMENTS

| | | | |
|---|---|---|---|
| 3,732,965 | 5/1973 | Mero | 400/682 |
| 3,830,352 | 8/1974 | Kolpek | 400/682 |
| 3,990,565 | 11/1976 | Felton et al. | 400/682 X |
| 4,118,128 | 10/1978 | Van Den Essen | 346/76 L X |
| 4,330,776 | 5/1982 | Dennison, Jr. et al. | 400/682 X |
| 4,378,553 | 3/1983 | McCall | 400/82 X |
| 4,661,005 | 4/1987 | Lahr | 400/682 X |
| 4,709,972 | 12/1987 | LaBudde et al. | 400/715 X |
| 4,830,525 | 5/1989 | Nagashima et al. | 400/682 X |

Primary Examiner—Edgar S. Burr
Assistant Examiner—Moshe I. Cohen
Attorney, Agent, or Firm—H. Gordon Shields

[57] ABSTRACT

Ergonomic keyboard apparatus includes a keyboard separable into two portions, and each portion is movable along a curved track so that the portions may be spaced apart a desired distance. The keyboard portions are also individually adjustable for the physical comfort of the user by in and out movements with respect to the track, and the keyboard portions are also pivotable or rotatable and tiltable so that movement in effectively three planes is accomplished to provide for the physical characteristics and physical comfort of the user. Supports are also provided for the user's wrists, and the wrist supports are adjustable towards and away from the keyboard portions.

7 Claims, 4 Drawing Sheets

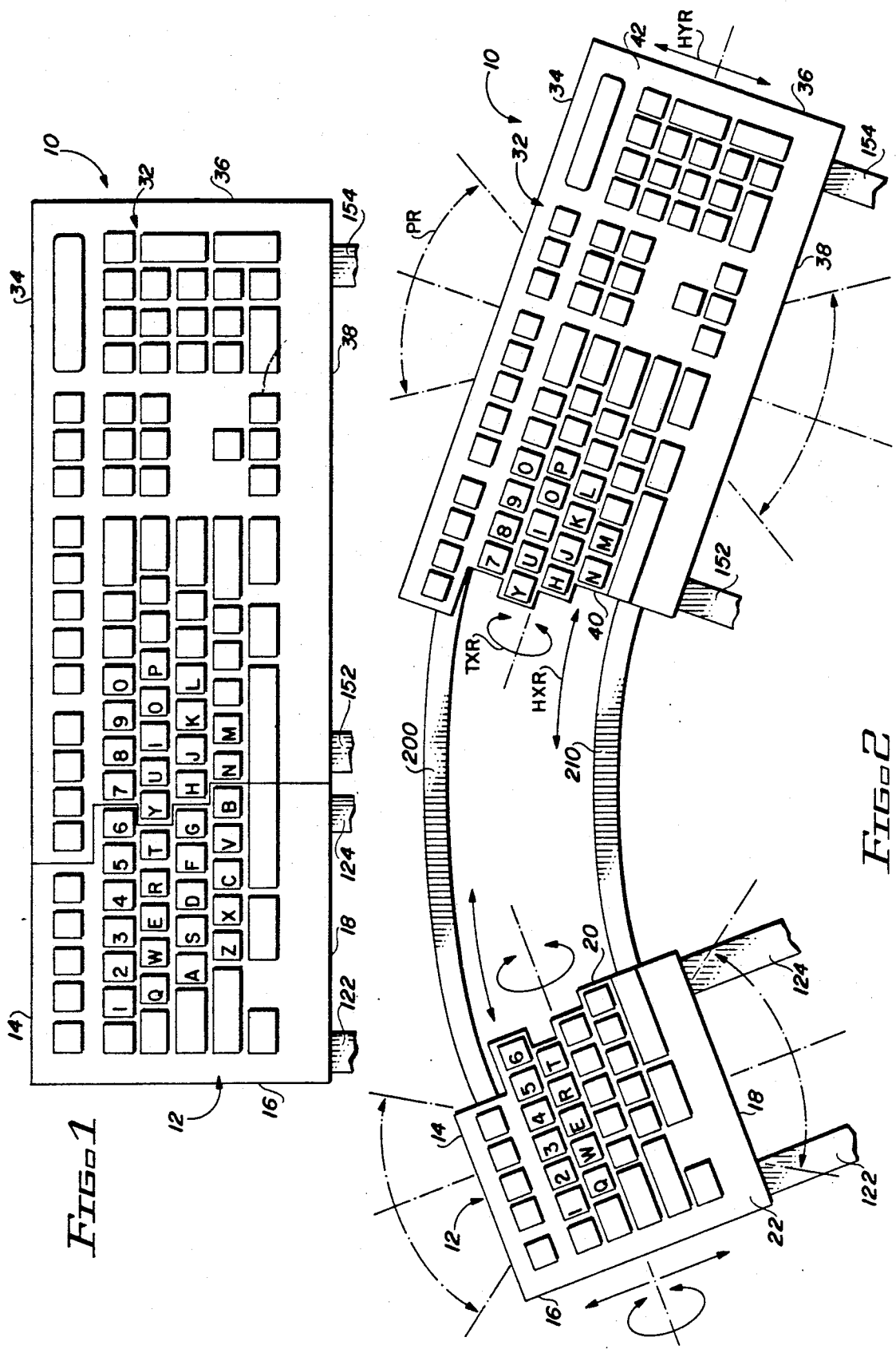

ERGONOMIC KEYBOARD APPARATUS

BACKGROUND OF THE INVENTION

1. Field of the Invention

This invention relates to keyboard apparatus and, more particularly, to a keyboard apparatus adjustable to the physical characteristics of a user to provide maximum comfort and efficiency for the user.

2. Description of the Prior Art

U.S. Pat. No. 4,379,429 (Gubbe et al.) discloses a computer system which includes a shelf mounted on rollers, and the rollers are selectively movable on any of a plurality of tracks to adjust a keyboard to a desired height. The shelf moves inwardly for storage and is moved outwardly for use.

U.S. Pat. No. 4,407,200 (Hagstrom and Swanson) discloses another computer system in which a keyboard is secured to the front of the terminal and movable outwardly and downwardly to a convenient level for use by a user.

U.S. Pat. No. 4,515,086 (Kwiecinski and Yauger) discloses a work station for a word processing system. A keyboard is adjustable on a front platform at the work station and a console or monitor is disposed on an adjustable platform. A crank adjustment through a scissor strut mechanical linkage is used to adjust the height of the platform for the monitor or console. In addition, the platform includes a pivoting portion on which the console or monitor is directly disposed for angular adjustment of the monitor or console. The keyboard may also be adjusted to limited heights and limited angular adjustment by means of a series of vertically extending slots. The support shelf for the keyboard includes pins which extend through the slots and the limited height and angular adjustment is accomplished by securing the pins in the slots.

U.S. Pat. No. 4,567,835 (Reese and Fisher) discloses a manually adjustable table assembly for supporting a keyboard and a monitor. The keyboard and the monitor are disposed on adjustable tables or platforms. The platforms are independently adjustable.

U.S. Pat. No. 4,305,563 (Presson) discloses a turntable support for a keyboard and monitor. The apparatus is designed to be used as a work station, with four different orientations of the apparatus for four different users of the apparatus.

U.S. Pat. No. 4,378,553 (McCall) discloses a keyboard system in which the keyboard is split into two separate portions. The two portions are spaced apart from each other and may be adjusted to orient the keyboard portions for the user. The keyboard portions are spaced apart a predetermined or fixed amount, and they may be adjusted somewhat from the original, predetermined location.

U.S. Pat. No. 4,661,005 (Lahr) discloses a splitable keyboard in which the keyboard is divided into two portions. The two portions may be disposed adjacent to each other to provide a single or unitary keyboard, or they may be moved apart by sliding them on a fixed slide bar. In addition, the keyboard portions may be tilted on the slide bar.

In addition to the above patents, each of which deals, in some manner, with the adjustability of a keyboard, and, in some cases, related elements, there are other patents which disclose various types of adjustable racks, tables, or the like. For example, U.S. Pat. No. 1,601,988, (Vanderveld) discloses the mechanical elements involved in a rotating display rack.

U.S. Pat. No. 2,891,350 (Hansen) discloses an extension slide for a table and/or desk. Mechanical structure for extending a desk, and for tilting a desk, is illustrated.

U.S. Pat. No. 4,145,097 (Naess and Larsson) discloses a data terminal desk apparatus in which the desk includes a flat surface, when the desk apparatus is in its closed position. The desk includes different portions which open to disclose or provide a keyboard storage area within the desk. A monitor is secured to the back of the desk and is movable along the back of the desk on a rail system.

U.S. Pat. No. 4,624,510 (Jedziniak) discloses a shelf system for storing data processing equipment or elements. A primary housing includes storage space for a keyboard. The keyboard moves out of the cabinet storage space for use. A monitor disposed on the top of the cabinet is rotatable or pivotable on a turntable secured to the top of the cabinet.

Most of the patents discussed above disclose some type of movable support structure for some type of data processing equipment. Typically, there is a keyboard involved. An object of the patents, among others, appears to be to provide convenient data processing elements for a user. Both keyboards and monitors are typically involved. Obviously, the efficiency of a user is enhanced when both the terminal and the keyboard are conveniently oriented or located for the physical comfort of the user.

SUMMARY OF THE INVENTION

The invention described and claimed herein comprises an ergonomic keyboard in which a keyboard is separable into two portions. The portions are separable along an arcuate path. The portions are also individually adjustable towards and away from the user and they are individually tiltable and rotatable to provide maximum comfort for a user in order to position the portions of a keyboard in accordance with the physical characteristics of the user, and to provide structure to support a user's wrists to minimize stress on the user's wrist tendons.

Among the objects of the present invention are the following:

To provide new and useful keyboard apparatus;

To provide new and useful keyboard apparatus separable into two portions;

To provide new and useful keyboard apparatus movable along a curved track;

To provide new and useful keyboard apparatus movable along a curved track and separately movable relative to the track;

To provide support elements for a user's wrist at a keyboard;

To provide new and useful keyboard apparatus pivotable in three axes; and

To provide new and useful keyboard apparatus having two portions movable along a curved track, movable generally perpendicularly relative to the curved track, movable vertically, and pivotable in two axes for the physical comfort of the user.

BRIEF DESCRIPTION OF THE DRAWING

FIG. 1 is top plan view of a keyboard embodying the apparatus of the present invention.

FIG. 2 is top plan view of the keyboard apparatus of FIG. 1 separated into two portions.

DESCRIPTION OF THE PREFERRED EMBODIMENT

Figure 3:
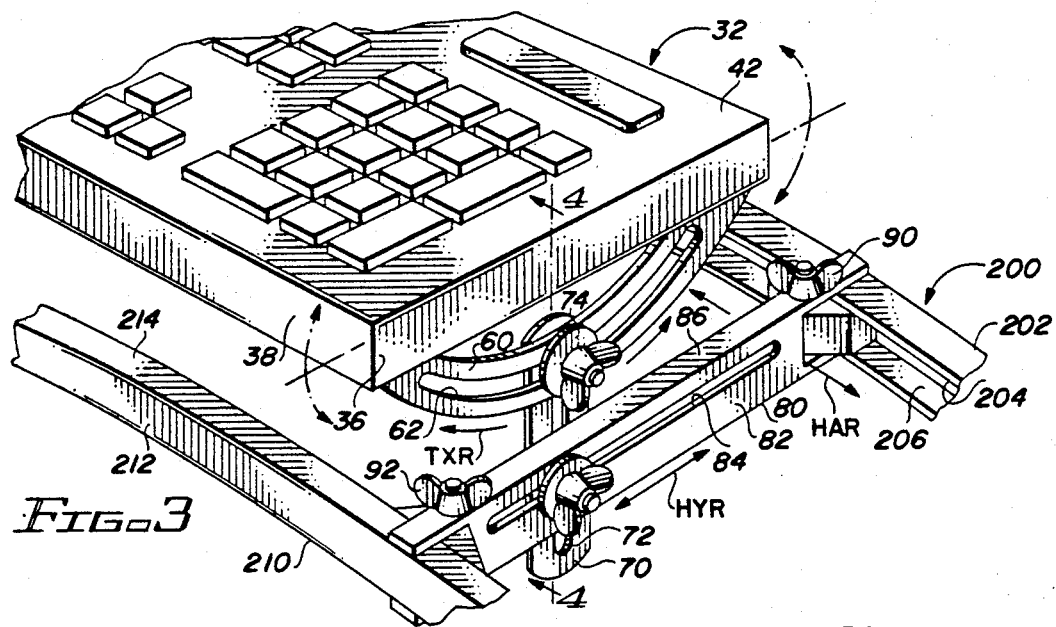
FIG. 3 is a perspective view of a portion of the apparatus of the present invention.

FIG. 1 is a top plan view of ergonomic keyboard apparatus 10 embodying the present invention. The keyboard 10 includes two portions which are separable and which move along a pair of curved tracks 200 and 210. The two portions, a left portion 12 and a right hand portion 32, are shown separated in FIG. 2. FIG. 2 is a top plan view of the apparatus 10 separated, with the two portions 12 and 32 spaced apart from each other. The two portions 12 and 32 are appropriately secured to, for movement on, a track comprising a pair of curved channels 200 and 210.

It will be noted that the left hand portion 12 is smaller than the right hand portion 32. The keyboard apparatus 10 is in the general configuration of what is referred to as an enhanced computer keyboard, which includes the typical abc . . . and 123 . . . keys, function keys, cursor keys, a keypad, and the other keys commonly used as part of a computer terminal. Obviously, the keyboard apparatus 10 may include as many or as few keys as desired for the particular circumstances. The basic idea behind the keyboard apparatus 10 is that it is separable so as to be accommodating to the physical requirements or needs or desires of a particular operator.

The left hand portion 12 of the keyboard apparatus 10 includes a top edge 14, an outside edge 16, a bottom edge 18, and an inside edge 20. It will be noted that the inside edge 20 is irregular so as to conform to the inside edge of the right hand portion 32.

The left hand portion 12 of the keyboard apparatus 10 also includes a top surface 22 and a bottom surface 24. The various keys extend upwardly from the top surface 22. Various elements are secured to the bottom surface 24, as will be discussed in detail below.

The right hand portion 32 of the keyboard apparatus 10 includes a top edge 34, an outside edge 36, a bottom edge 38, and an inside edge 40. The inside edge 40 is also irregular, and mates with the inside edge 20 of the left hand portion 12.

The right hand portion 32 also includes a top surface 42 and a bottom surface 44. Again, the various keys on the right hand portion 32 extends upwardly from the top surface 42. And again, a plurality of elements are secured to the bottom surface 44.

The two portions 12 and 32 are separated in accordance with the normal finger positions on the keys of a standard typewriter. That is, the left hand portion 12 includes the alphanumeric keys normally actuated by the keys normally actuated by a user's right hand.

As indicated in FIG. 2, the left hand portion 12 and the right hand portion 32 are not only separable, but they are independently movable. Thus, each portion is independently movable on the tracks 200 and 210, pivotable, tiltable, and movable upwardly or downwardly, and movable forwardly and rearwardly, as desired for an individual user. The keyboard portions 12 and 34 move independently on the axis on the rails 200 and 210, they raise and lower relative to the rails 200 and 210 in the Z axis, they are movable in the Y axis generally perpendicularly to the rails 200 and 210, they are pivotable in the horizontal plane, and they are tiltable about their horizontal axis. The structure for accomplishing all of these various ergonomic positioning functions is illustrated in FIGS. 3, 4, 5, and 6. In FIG. 2, the horizontal movement of the keyboard portion 32 on the rails 200 and 210 is indicated by the double headed arrow HXR.

Figure 4:
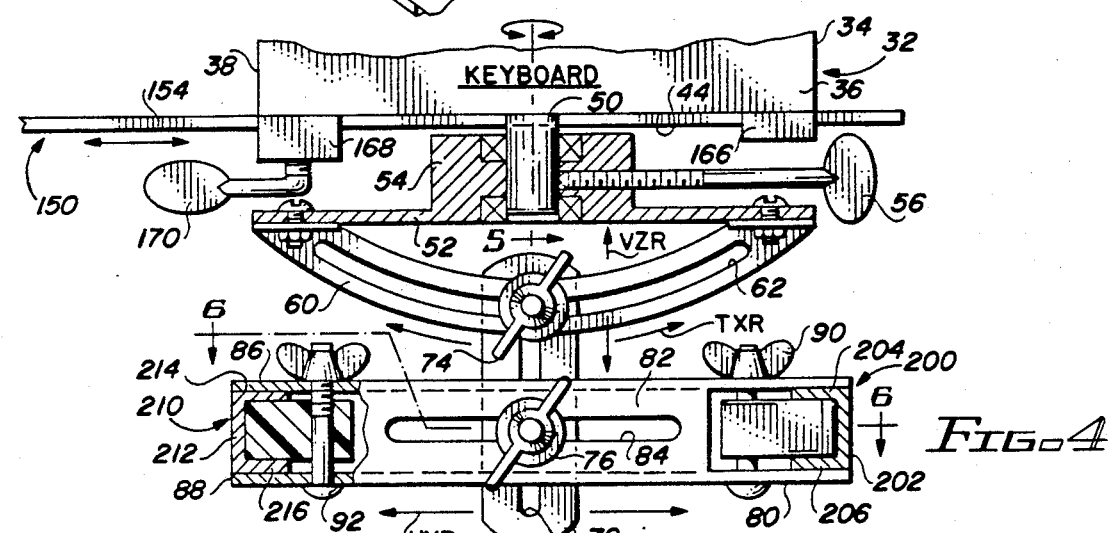
FIG. 4 is a view in partial section taken generally along line 4—4 of FIG. 3.
Figure 5:
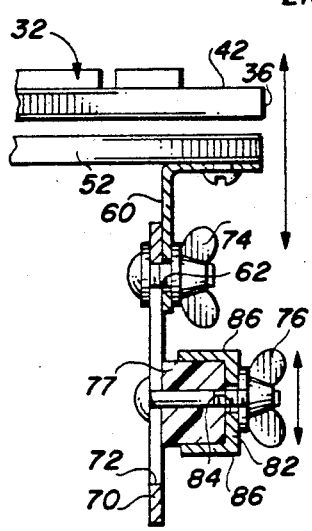
FIG. 5 is a view in partial section taken generally along line 5—5 of FIG. 4.
Figure 6:
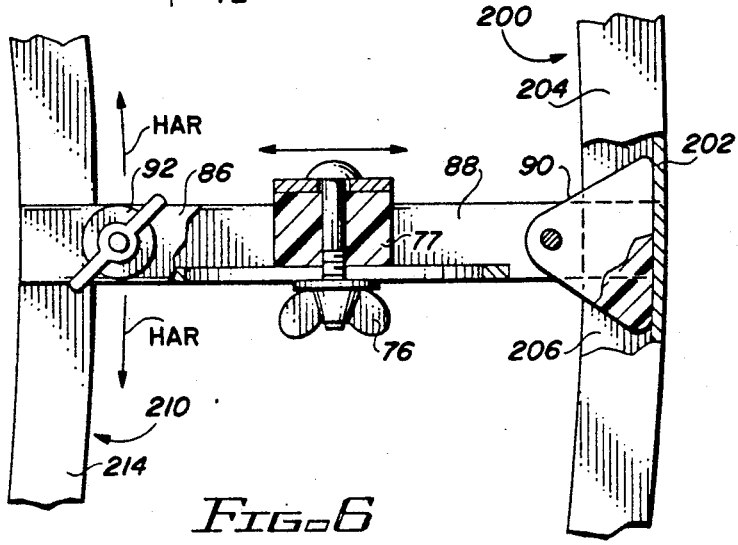
FIG. 6 is a view in partial section taken generally along line 6—6 of FIG. 4.

FIG. 3 is a perspective view of part of the right portion 32 of the keyboard apparatus 10, illustrating some of the mechanical elements involved in the various positioning movements of the keyboard apparatus 10. FIG. 4 is a view in partial section of the keyboard apparatus 32 taken generally along line 4—4 of FIG. 3, further illustrating some of the mechanical elements involved. FIG. 5 is a view in partial section through the apparatus of FIG. 4 taken generally along line 5—5, and FIG. 6 is a view in partial section taken generally along line 6—6 of FIG. 4. Both FIGS. 5 and 6 further illustrating some of the mechanical elements involved in the keyboard apparatus 10. For the following discussion, reference will primarily be made to FIGS. 3, 4, 5, and 6. It will be understood that the mechanical elements illustrated in FIGS. 3, 4, 5, and 6, while directed to the right hand keyboard section or portion 32, is also applicable to the left hand keyboard section 12. Moreover, while only single mechanical elements are sometimes illustrated, it will be understood that there may be two such mechanical elements generally involved, one at each end of the keyboard sections or portions.

For the circular moving or pivoting of the keyboard section or portion 32, as illustrated by the double arrows PR in FIG. 2, attention will be directed primarily to FIG. 4. A pivot pin 50 is appropriately secured to the keyboard section or portion 32. The pivot pin 50 is also secured to a platform base 52 through a pin boss 54. The pin boss 54 extends upwardly from the platform base 52. The pin 50 is appropriately journaled for a pivoting or rotating movement.

A thumb screw 56 is used to lock the keyboard portion 32 to the platform base 52. The thumb screw is loosened to allow the keyboard portion 32 to be pivotally or rotatably adjusted, and the thumb screw is then tightened to lock the keyboard portion 32 to the base 52.

The pin 50 is fixedly secured to the keyboard portion 34 and it extends downwardly from the bottom 42 of the keyboard portion 32. The thumb screw 56 extends generally horizontally through a threaded bore in the boss 54. The threaded bore communicates with a vertically extending bore in which the pivot pin 50 is disposed. The thumb screw 56 is, of course, externally threaded to mate with the internal threads of its supporting bore. The thumb screw 56 and the pin 50 operate in a well known and understood manner with respect to the locking and unlocking functions.

For tilting, as illustrated by the curved arrows TXR in FIGS. 2, 3, and 4, the keyboard portion 32 utilizes a curved bracket 60 and a slot 62 disposed therein. The curved bracket 60 is best illustrated in FIGS. 3, 4, and 5.

The curved bracket 60 is appropriately secured to the base 52. The slot 62 extends through an appropriate arc to allow the keyboard portion 32 to tilt as desired by the individual user.

For moving in the vertical plane, or moving vertically with respect to the fixed track elements 200 and 210, as indicated by the vertically oriented arrows VZR in FIG. 4, a vertical bracket 70 is appropriately secured to the curved bracket 60. The vertical bracket 70 includes a slot 72. The bracket 70 is disposed, at its upper portion, against the curved bracket 60. The slots 60 and 72 are disposed against each other, and an upper thumb screw assembly 74 extends through the slot 62 and 72 to secure the vertical bracket 70 to the curved bracket 60.

For horizontal movement in the Y direction, as indicated by the double headed arrow HYR in FIG. 2, FIG. 3, and FIG. 4, a horizontal bracket 80 is utilized. The horizontal bracket 80 includes a vertical web 82. There is a slot 84 extending through the web 82. The bracket 80 also includes a top horizontally extending flange 86 and a bottom horizontally extending flange 88. The bracket 80 accordingly is in the general configuration of a channel element disposed on its side. Extending through the slot 84 is a lower thumb screw assembly 76. The bracket 70 is disposed against the bracket 80, with the slot 72 in the vertical bracket 70 aligned with the slot 84 in the web 82 of the bracket 80. The lower thumb screw assembly 76 extends through the aligned slots 72 and 84. By loosening the thumb screw assembly 76, the keyboard portion 32 may be moved horizontally relative to the slot 84 so as to move the keyboard portion 82 closer to or farther away from a user. An appropriate bearing element 77 of the thumb screw assembly 76 is illustrated in FIGS. 5 and 6.

For positioning or moving the keyboard portion 32 horizontally and arcuately along the tracks 200 and 210, as indicated by the double headed arrows HXR in FIG. 2, FIG. 3, FIG. 4 and FIG. 6, the horizontal bracket 80 is moved along the tracks 200 and 210.

The tracks 200 and 210 comprise a pair of horizontally extending and curved channel track elements. The rear channel track element 200 includes a vertical web 202, a top horizontally extending flange 204, and a bottom horizontally extending flange 206. The front channel track element 210 includes a vertical web 212, a top horizontally extending web 214, and a bottom horizontally extending flange 216. The vertical webs 202 and 212 are generally parallel to each other. The top flanges 204 and 214 are generally parallel to and aligned with each other, as are the bottom flanges 206 and 216.

The horizontal bracket 80 includes a thumb screw assembly 90 which matingly engages the rear channel track element 200, and a thumb screw assembly 92 which matingly engages the front channel track element 210.

As best shown in FIGS. 3, 4, and 6, the top horizontally extending flange 86 of the bracket 80 is disposed on top of the horizontally extending flanges 204 and 214 of the tracks 200 and 210, respectively. Similarly, the bottom horizontally extending flange 88 of the bracket 80 is disposed against the bottom or outside of the horizontally extending flanges 206 and 216 of the tracks 200 and 210, respectively. The thumb screw assemblies 90 and 92 include bearing elements which extend into the channels or between the flanges 204 and 206 of the channel 200 and between the flanges 214 and 216 of the channel 210, respectively. The thumb screw assemblies 90 and 92 then apply force against the flanges of the channel elements to secure the bracket 80 to the tracks 200 and 210. When the thumb screw assemblies 90 and 92 are loosened, the bracket 82, and the keyboard portion 32 to which it is secured, may be moved horizontally and arcuately along the track which consists of the channel track elements 200 and 210.

Figure 7:
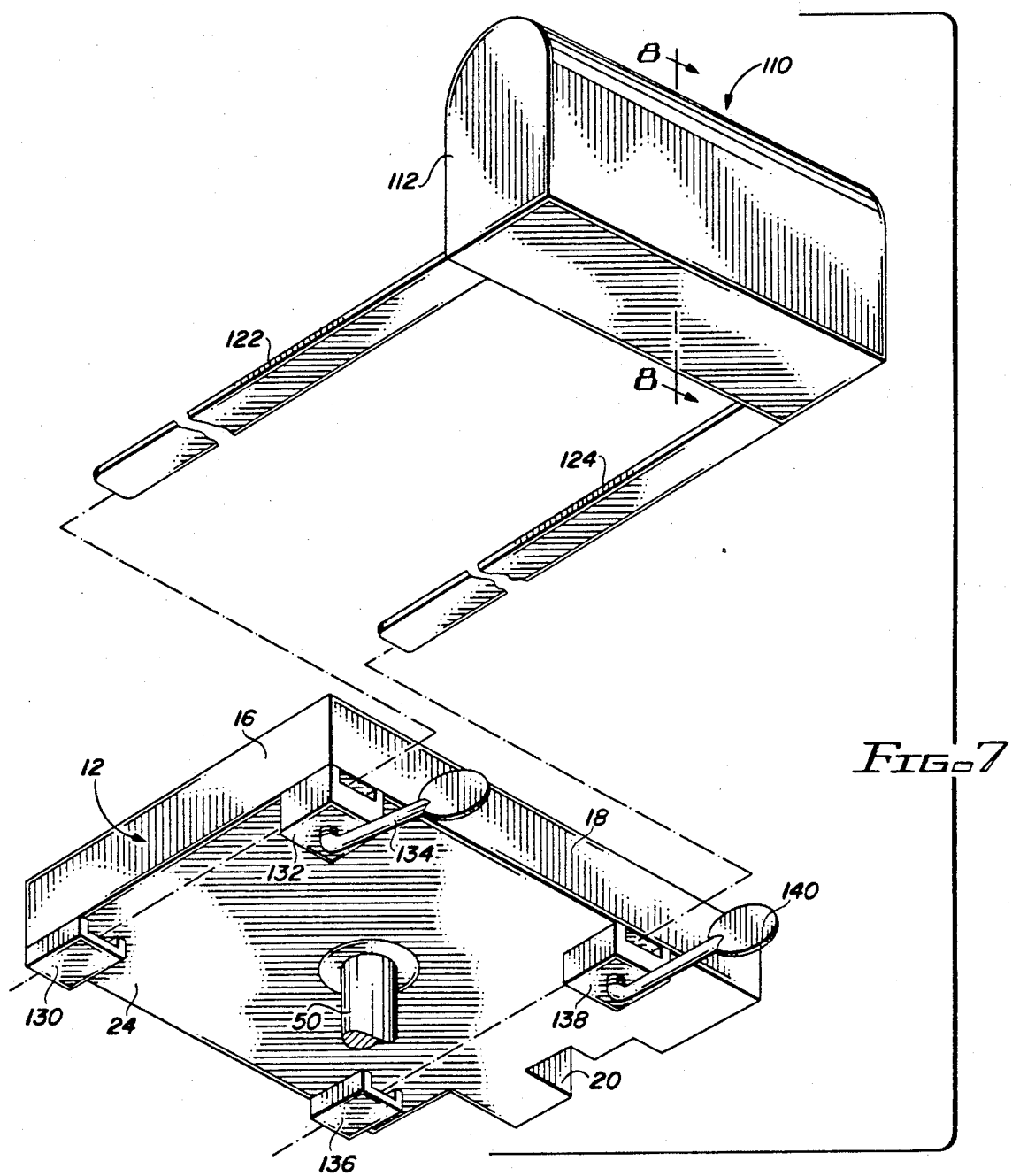
FIG. 7 is an exploded perspective view of a portion of the apparatus of the present invention.
Figure 8:
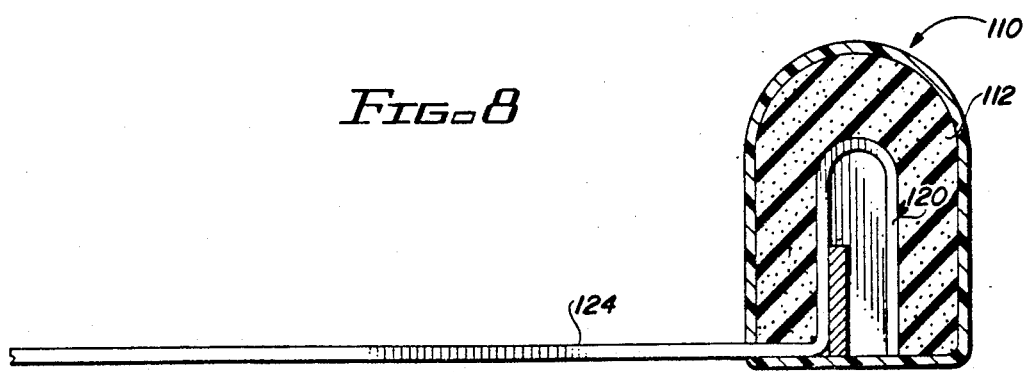
FIG. 8 is a view in partial section taken generally along line 8—8 of FIG. 7.

For supporting the wrist of a user, a pair of wrist support assemblies are used. The wrist support assemblies include a left wrist support assembly 110 illustrated in FIGS. 7 and 8. FIG. 7 is a perspective view of the wrist support assembly 110 shown spaced apart from the left hand keyboard portion 12. FIG. 8 is a view in partial section through the wrist support assembly 110 taken generally along line 8—8 of FIG. 7. For the following discussion of the wrist support assembly 110, reference will primarily be made to FIGS. 7 and 8.

The wrist support assembly 110 includes a vertically extending cushion 112 secured to a support form 120. The support form 120 includes a pair of generally horizontally extending arms 122 and 124. The arms 122 and 124 cooperate with channel brackets secured to the bottom 24 of the keyboard portion 12. The channel brackets include a rear channel bracket 130 and a front channel bracket 132 for the arm 122, and a rear channel bracket 136 and a front channel bracket 138 for the arm 124.

A thumb screw 134 is secured to the front channel bracket 132, and a thumb screw 140 is secured to the front channel bracket 138. The purpose of the thumb screws 134 and 140 is, of course, to lock the wrist support assembly 110 in a location appropriate to the desires or needs of the user of the apparatus. Thus, the arms 122 and 124 move horizontally inwardly and outwardly, or towards and away from a user in the respective brackets 130, 132 and 136, 138. Loosening the thumb screws 134 and 140 allows for the movement of the wrist support assembly 110. When the wrist support assembly is in place, the thumb screws 134 and 140 are then tightened to lock the wrist support assembly in place, as desired by the user.

Stubs or portions of the arms 122 and 124 are shown in FIGS. 1 and 2. Also, portions or stubs of a pair of arms 152 and 154 are also shown in FIGS. 1, 2, and 4, for a right hand wrist support assembly 150.

It will be noted that the arms 152 and 154 are spaced apart farther than the arms 122 and 124. Obviously, since the right hand keyboard portion 32 is wider than the left hand portion 12, the wrist support assembly 150 for the right handed portion 32 will be longer than the wrist support assembly 110 for the left hand keyboard portion 12.

In FIG. 4, the arm 154 is shown extending into a pair of channel brackets 166 and 168. The channel brackets 166 and 168 are appropriately secured to the bottom 42 of the right hand keyboard portion 32. A thumb screw 170 is shown secured to the channel bracket 168 for locking the arm 154 in place.

Figure 9:
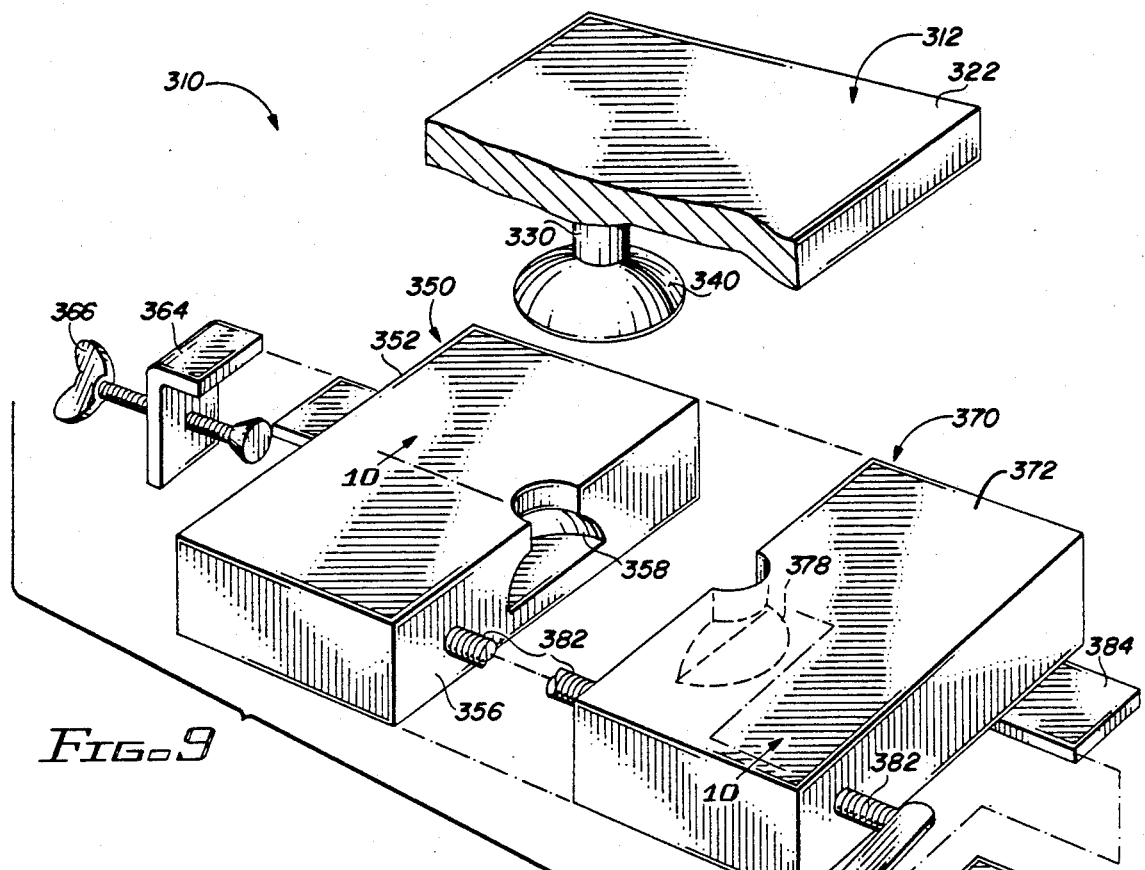
FIG. 9 is an exploded perspective view of an alternate embodiment of a portion of the apparatus of the present invention.
Figure 10:
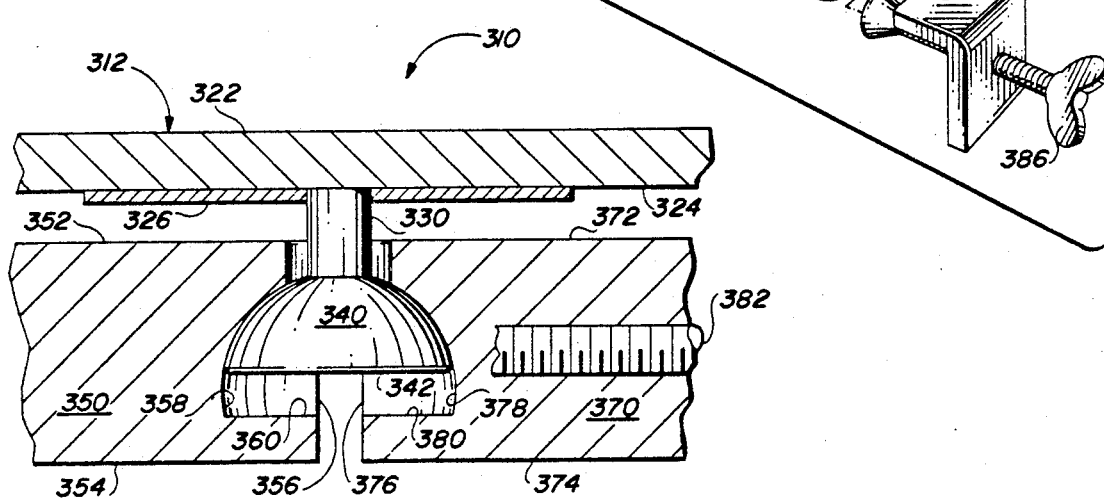
FIG. 10 is a side view in partial section of the assembled apparatus of FIG. 9 taken generally along line 10—10 of FIG. 9.

To further enhance the ergonomic features of the apparatus of the present invention, elements are illustrated in FIGS. 9 and 10 for the double tilting of the keyboard portions. The keyboard elements illustrated in FIGS. 9 and 10 allow the keyboard elements to be tilted about both the X axis and the Y axis. The elements illustrated in FIGS. 3, 4, and 5 allow the keyboard apparatus to be tilted only about the X axis.

FIG. 9 is an exploded perspective view of keyboard apparatus 310, and FIG. 10 is a view in partial section taken generally along line 10—10 of FIG. 9, with the elements of FIG. 9 shown assembled. The keyboard apparatus 310 includes a keyboard portion 312 for only one hand to illustrate the mechanical elements associated therewith. Obviously, as with the keyboard apparatus 10 and its two portions 12 and 32, as discussed in detail above, there will be another portion of the keyboard apparatus 310 for the user's other hand.

The keyboard portion 312 includes a top surface 322 and a bottom surface 324. A support plate 326 is secured to the bottom surface 324. A pin 330 is secured to the keyboard portion 312 and the plate 326. The pin 330 extends downwardly substantially perpendicularly to the keyboard portion 312.

At the distal end of the pin 330, remote from the plate 326 and the keyboard portion 312, is a ball element 340. The ball element 340 is actually a hemispherical element, or the upper portion of a ball, with the pin 330 secured to and extending upwardly from the top portion of the hemisphere. The ball element 340 includes a generally flat bottom 342. The generally flat bottom 342 is remote from the pin 330.

The ball, or hemisphere 340, is adjustably disposed between a pair of blocks 350 and 370. The blocks 350 and 370 are of a generally rectangular configuration, with a pair of top and bottom planar surfaces which are generally aligned with each other and are parallel to each other. The block 350 includes a top surface 352 and a bottom surface 354. The surfaces 352 and 354 are generally parallel to each other. The block 350 also includes an interior face 356. Extending inwardly into the block 350 from the interior face 356 is a socket 358. The socket 358 includes a bottom 360. The bottom 360 comprises a tilt limiting flange which limits the tilt of the ball or hemisphere 340, as will be discussed below.

Extending outwardly from the block 350 is a bracket 364. The bracket 364 is a generally L-shaped bracket which includes a horizontally extending arm and a vertically downwardly extending arm. The vertically extending arm mates with a vertically extending bracket, such as the bracket 70 of FIGS. 3, 4, and 5, and is secured thereto by a thumb screw assembly 366.

The block 370 is substantially identical to the block 350, but is a mirror image thereof. The block 370 includes a top surface 372 and a bottom surface 374. The surfaces 372 and 374 are generally parallel to each other. Moreover, the top surface 352 of the block 350 is aligned with the top surface 372 of the block 370. Similarly, the bottom surface 354 of the block 350 is aligned with the bottom surface 374 of the block 370.

A bracket 384, substantially identical to the bracket 364, is secured to the block 370. A thumb screw assembly 386 is secured to the vertically extending arm of the bracket 384. The vertically extending leg or arm of the bracket 384, and the thumb screw assembly 386, appropriately mate with a vertically extending bracket, again such as the bracket 70 referred to above.

A thumb screw 382 extends through the block 370 and into the block 350. The thumb screw 382 is used to secure the two blocks 350 and 370 together.

The block 370 includes an interior face 376 disposed adjacent to, and parallel with, the interior face 356 of the block 350. A socket 378 extends into the block 370 from the interior face 376. The bottom of the socket 378 is closed by a tilt limiting flange 380. The sockets 358 and 378 are disposed adjacent to each other and receive the hemisphere 340. The thumb screw 382 is used to lock the ball or hemisphere 340 within the socket elements 358 and 378 of the blocks 350 and 370, respectively.

The height of the sockets, from their bottoms, or bottom flanges, is greater than the height of the ball or hemisphere 340 to allow the hemisphere 340 to move in the sockets to allow the keyboard portion 312 to tilt through a desired angular amount in the X and Y planes. In FIG. 10, the hemisphere 340 is shown disposed about the bottoms 360 and 380. In actual usage, of course, the bottom 342 of the hemisphere would be disposed on the bottoms when the keyboard portion 312 is generally horizontally parallel to the blocks 350 and 370. If desired, there may be a spring extending between the bottoms 360 and 380 and the bottom 342 to provide an upward bias on the hemisphere 340. Obviously, other mechanical relationships, etc., may also be used.

It will be understood that, using essentially a ball and socket type joint, the keyboard portion 312 may be tilted freely in the X-Y directions. The tilt of the keyboard assembly 312 will be limited to the overall depth of the socket 358 and 378 and their respective tilt limiting surfaces or bottoms 360 and 380. Thus, utilizing a pair of keyboard elements with ball and socket type joints, the keyboard portions may be appropriately tilted as desired by the individual user to accommodate to the physical constraints or parameters of an individual user, or to the physical characteristics of the hands, wrists, and forearms of the individual user.

For example, if a user has a particular physical limitation on one hand or wrist, using the apparatus of the present invention, or a ball and socket joint, if desired, such physical constraints or limitations or parameters may be appropriately minimized or accommodated by the desired positioning of the keyboard apparatus. However, if the other hand has no such limitation(s) or has different limitations, then the other keyboard portion for that hand may be oriented in a different manner.

Since the keyboard portions are separately or independently positionable and/or adjustable, the keyboard portions may be particularly adjusted to the needs of the individual user's hands or to the physical constraints or parameters of the user, whatever they may be.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Ergonomic keyboard apparatus comprising, in combination:

keyboard means, including a first keyboard portion and a second keyboard portion;

arcuately extending track means on which the first and second keyboard portions are movable to space the first keyboard portion apart from the second keyboard portion and radially outwardly from a user; and means for moving the keyboard means relative to the track means for positioning the keyboard portions as desired for the user's hands.

2. The apparatus of claim 1 in which the keyboard means includes wrist support means for supporting the user's wrists at the first and second keyboard portions.

3. The apparatus of claim 2 in which the wrist support means is movable towards and away from the first and second keyboard portions for supporting the user's wrists.

4. The apparatus of claim 1 in which the means for moving the keyboard portions relative to the track means includes means for moving the keyboard portions towards and away from the user.

5. The apparatus of claim 4 in which the means for moving the keyboard portions relative to the track means further includes means for raising and lowering each keyboard portion.

6. The apparatus of claim 5 in which the means for moving the keyboard portions relative to the track means further includes means for tilting each keyboard portion.

7. The apparatus of claim 6 in which the means for tilting the keyboard portions includes a ball and socket type joint for tilting a keyboard portion about an X axis and about a Y axis.

* * * * *